United States Patent
Devadoss et al.

(10) Patent No.: US 12,416,329 B2
(45) Date of Patent: Sep. 16, 2025

(54) BEARING ASSEMBLY WITH LOAD ISOLATION FOR GAS TURBINE ENGINE

(71) Applicant: HONEYWELL INTERNATIONAL INC., Charlotte, NC (US)

(72) Inventors: Gnanaraj Devadoss, Bangalore (IN); Avinash Kumar, Bangalore (IN); Akhil Thampi, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 104 days.

(21) Appl. No.: 18/463,740

(22) Filed: Sep. 8, 2023

(65) Prior Publication Data

US 2024/0301915 A1  Sep. 12, 2024

(30) Foreign Application Priority Data

Mar. 10, 2023  (IN) .............................. 202311016104

(51) Int. Cl.
*F16C 19/52* (2006.01)
*F01D 25/16* (2006.01)
*F16C 35/077* (2006.01)

(52) U.S. Cl.
CPC .......... *F16C 19/522* (2013.01); *F01D 25/162* (2013.01); *F16C 35/077* (2013.01); *F05D 2240/50* (2013.01); *F16C 2360/23* (2013.01)

(58) Field of Classification Search
CPC .... F16C 19/522; F16C 35/042; F16C 35/045; F16C 35/067; F16C 35/077; F16C 2360/23; F01D 25/162; F05D 2240/50
See application file for complete search history.

(56) References Cited

U.S. PATENT DOCUMENTS

| | | |
|---|---|---|
| 6,447,248 B1 | 9/2002 | Kastl et al. |
| 8,167,531 B2 | 5/2012 | Mollmann et al. |
| 9,777,596 B2 | 10/2017 | Raykowski et al. |
| 9,909,451 B2 | 3/2018 | Carter et al. |

(Continued)

FOREIGN PATENT DOCUMENTS

| | | |
|---|---|---|
| EP | 1199441 A2 | 4/2002 |
| EP | 2119876 A2 | 11/2009 |

(Continued)

OTHER PUBLICATIONS

Winstanley, David K., HTF7000 Engine Design, Development and Uses, SAE 2013 AeroTech Congress & Exhibition, Sep. 25, 2013, pp. 1-16.

(Continued)

*Primary Examiner* — Phillip A Johnson
(74) *Attorney, Agent, or Firm* — Lorenz & Kopf LLP

(57) ABSTRACT

A bearing assembly includes an inner race to receive a rotating component having an axis of rotation, and at least one bearing element coupled to the inner race. The at least one bearing element is to rotate with the inner race along the axis of rotation. The bearing assembly includes an outer race coupled to the at least one bearing element, and a bearing housing coupled to the outer race and to be coupled to a static structure. The bearing housing includes a first frangible portion to release upon receipt of a moment load greater than a moment threshold and a second frangible portion to release upon receipt of a radial load greater than a radial threshold.

20 Claims, 9 Drawing Sheets

(56) References Cited

U.S. PATENT DOCUMENTS

| | | |
|---|---|---|
| 10,190,439 B2 | 1/2019 | Korshikov et al. |
| 10,590,801 B2 | 3/2020 | Phillips |
| 10,626,925 B2 | 4/2020 | Boniface |
| 2018/0112554 A1* | 4/2018 | Ghosh .................... F16C 29/123 |
| 2018/0112672 A1* | 4/2018 | Ganiger ................ F16C 25/083 |
| 2019/0257213 A1 | 8/2019 | Zilli |
| 2021/0270147 A1 | 9/2021 | Grubba et al. |

FOREIGN PATENT DOCUMENTS

| | | | |
|---|---|---|---|
| EP | 3205840 A1 * | 8/2017 | ............. F01D 21/00 |
| EP | 3715651 A1 | 3/2020 | |
| EP | 3438420 B1 | 1/2022 | |
| FR | 2877994 A1 | 5/2006 | |

OTHER PUBLICATIONS

Van Moorselaar, M.P.R., Gas Path Analysis on the GEnx-1B at KLM Engine Services, Master's Thesis, Delft University, Sep. 24, 2018.

\* cited by examiner

BEARING ASSEMBLY WITH LOAD ISOLATION FOR GAS TURBINE ENGINE

CROSS REFERENCE TO RELATED APPLICATION

This application claims priority to Indian Provisional Patent Application No. 202311016104, filed Mar. 10, 2023, the entire content of which is incorporated by reference herein.

TECHNICAL FIELD

The present disclosure generally relates to gas turbine engines, and more particularly relates to a bearing assembly with load isolation for a gas turbine engine.

BACKGROUND

Gas turbine engines may be employed to power various devices. For example, a gas turbine engine may be employed to power a mobile platform, such as an aircraft or rotorcraft. Gas turbine engines may include one or more rotating components, which are supported by one or more bearings. Generally, a portion of the bearing is coupled to a static structure of the gas turbine engine. In certain instances, the rotating component may introduce loads into the bearing, which may be transferred to the static structure through the bearing. The transfer of the loads from the bearing to the static structure is undesirable as it may impact the performance of the static structure.

Accordingly, it is desirable to provide a bearing assembly with load isolation for a gas turbine engine, which inhibits the transfer of loads to a static structure associated with the gas turbine engine through the bearing assembly. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a bearing assembly. The bearing assembly includes an inner race configured to receive a rotating component having an axis of rotation, and at least one bearing element coupled to the inner race. The at least one bearing element is configured to rotate with the inner race along the axis of rotation. The bearing assembly includes an outer race coupled to the at least one bearing element, and a bearing housing coupled to the outer race and configured to be coupled to a static structure. The bearing housing includes a first frangible portion configured to release upon receipt of a moment load greater than a moment threshold and a second frangible portion configured to release upon receipt of a radial load greater than a radial threshold.

The first frangible portion is defined on the bearing housing along an axis substantially perpendicular to the axis of rotation. The second frangible portion is defined on the bearing housing along an axis substantially parallel to the axis of rotation. The first frangible portion includes at least one first groove that defines a reduced thickness. The second frangible portion includes at least one second groove that defines a second reduced thickness. The at least one first groove is continuous about a perimeter of the first frangible portion. The at least one first groove comprises a pair of opposed grooves that cooperate to define the reduced thickness. The first frangible portion includes a plurality of first slots spaced apart about a perimeter of the first frangible portion. The second frangible portion includes a plurality of second slots spaced apart about a second perimeter of the second frangible portion. Each second slot extends along a major axis, and the major axis is substantially parallel to the axis of rotation. Each first slot extends along a major axis, and the major axis is substantially perpendicular to the axis of rotation. The bearing housing includes a first coupling section to be coupled to the outer race, a second coupling section configured to be coupled to the static structure, and the first frangible portion and the second frangible portion are defined between the first coupling section and the second coupling section. The first frangible portion extends radially outward from the first coupling section, and the second frangible portion extends axially from the first frangible portion relative to the axis of rotation. The second frangible portion is coupled to a first end of the second coupling section, and the second coupling section defines a flange at a second end, with the second end opposite the first end. The rotating component is a shaft associated with a gas turbine engine.

Further provided is a bearing assembly for a gas turbine engine. The bearing assembly includes an inner race configured to receive a rotating component having an axis of rotation. The bearing assembly includes at least one bearing element coupled to the inner race, and the at least one bearing element is configured to rotate with the inner race along the axis of rotation. The bearing assembly includes an outer race coupled to the at least one bearing element, and a bearing housing coupled to the outer race and configured to be coupled to a static structure. The bearing housing includes a first frangible portion and a second frangible portion. The first frangible portion extends along a first axis substantially perpendicular to the axis of rotation, and the first frangible portion is configured to release upon receipt of a moment load greater than a moment threshold. The second frangible portion extends along a second axis substantially parallel to the axis of rotation and the second frangible portion is configured to release upon receipt of a radial load greater than a radial threshold.

The first frangible portion includes a pair of opposed grooves that cooperate to define a reduced thickness and each groove of the pair of opposed grooves is continuous about a perimeter of the first frangible portion. The first frangible portion includes a plurality of first slots spaced apart about a perimeter of the first frangible portion and the second frangible portion includes a plurality of second slots spaced apart about a second perimeter of the second frangible portion. Each second slot extends along a major axis, the major axis is substantially parallel to the axis of rotation. Each first slot extends along a major axis, and the major axis is substantially perpendicular to the axis of rotation.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
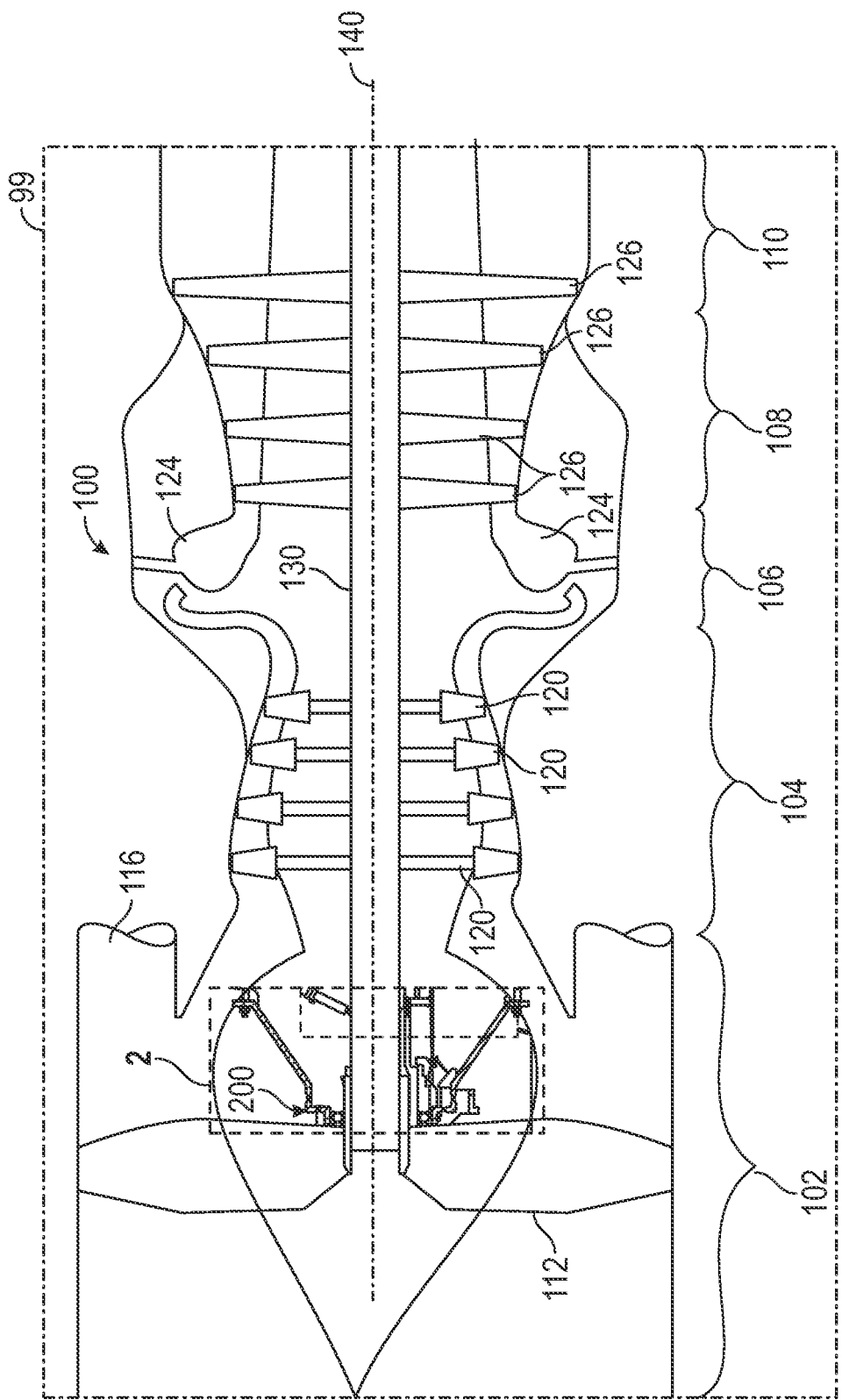
FIG. 1 is a schematic cross-sectional illustration of a gas turbine engine, which includes an exemplary bearing assembly with load isolation in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of engine that would benefit from a bearing assembly with load isolation and the gas turbine engine described herein is merely one exemplary embodiment according to the present disclosure. In addition, while the bearing assembly is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a simplified cross-sectional view of an exemplary gas turbine engine 100 is shown with the remaining portion of the gas turbine engine 100 being substantially axisymmetric about an axis of rotation 140, which also comprises a longitudinal axis for the gas turbine engine 100. As will be discussed herein, the gas turbine engine 100 includes a bearing assembly 200 with load isolation, which inhibits loads, such as shear loads and moment loads, from passing through the bearing assembly 200 into a surrounding fixed or static structure. In the depicted embodiment, the gas turbine engine 100 is an annular multi-spool turbofan gas turbine jet engine for use with a vehicle, such as an aircraft 99, although other arrangements and uses may be provided. For example, in other embodiments, the gas turbine engine 100 may assume the form of a non-propulsive engine, such as an Auxiliary Power Unit (APU) deployed onboard the aircraft 99, or an industrial power generator.

In this example, the gas turbine engine 100 includes a fan section 102, a compressor section 104, a combustor section 106, a turbine section 108, and an exhaust section 110. The fan section 102 includes a fan 112 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. In the embodiment of FIG. 1, the compressor section 104 includes one or more compressors 120, and in one example, includes four compressors 120. However, in other embodiments, the number of compressors 120 in the compressor section 104 may vary. In the depicted embodiment, the compressors 120 sequentially raise the pressure of the air and direct a majority of the high pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 124, the high pressure air is mixed with fuel, which is combusted. The high-temperature combustion air is directed into the turbine section 108. In this example, the turbine section 108 includes one or more turbines 126, and in one example, includes four turbines 126 disposed in axial flow series. However, it will be appreciated that the number of turbines, and/or the configurations thereof, may vary. In this embodiment, the high-temperature air from the combustor section 106 expands through and rotates each turbine 126. As the turbines 126 rotate, each drives equipment in the gas turbine engine 100 via at least one concentrically disposed spool or shaft 130. The rotation of the spool or shaft 130 provides power output, which may be utilized in a variety of different manners, depending upon whether the gas turbine engine 100 assumes the form of a turbofan, turboprop, turboshaft, turbojet engine, or an auxiliary power unit, to list but a few examples. The spool or shaft 130 rotates about the axis of rotation 140.

Figure 2:
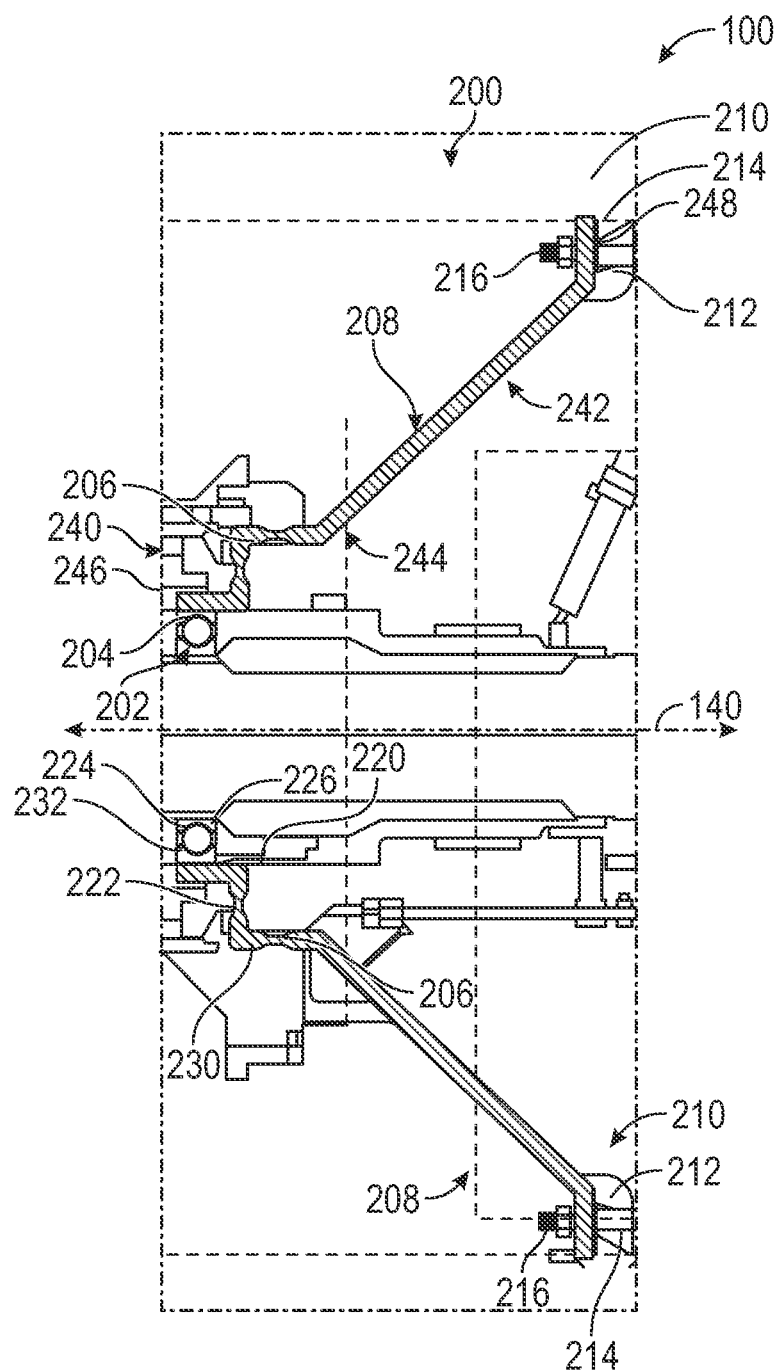
FIG. 2 is a detail cross-sectional view, taken at 2 on FIG. 1, of the bearing assembly with load isolation coupled about a shaft associated with the gas turbine engine in accordance with the various teachings of the present disclosure.

In this example, the bearing assembly 200 is coupled to a rotating component having an axis of rotation, such as the shaft 130 having the axis of rotation 140. The bearing assembly 200 is coupled to the shaft 130 proximate, downstream of or behind the fan 112 in the fan section 102. The bearing assembly 200 supports the shaft 130 for rotation. It should be noted that in other embodiments, the bearing assembly 200 may be used to support rotation of other rotating components associated with the gas turbine engine 100 and the location of the bearing assembly 200 is merely an example. With reference to FIG. 2, a detail cross-sectional view of a portion of the fan section 102 is shown. In one example, the bearing assembly 200 includes an inner race 202, one or more bearing elements 204, an outer race 206 and a bearing housing 208. In this example, the inner race 202 is coupled to the shaft 130, and the bearing housing 208 is coupled to a static structure 210, which in one example, is a flange 212 that is coupled to a strut 214 associated with the compressor section 104 (FIG. 1). The bearing housing 208 is coupled to the flange 212 via one or more mechanical fasteners, such as bolts 216. It should be noted that while not illustrated herein, the bearing assembly 200 may also include one or more seals.

As discussed, the inner race 202 is coupled to the shaft 130 via a press-fit, for example, but swaging and other techniques may be used to couple the inner race 202 to the shaft 130. The inner race 202 is coupled of a metal or metal alloy, and is cast, forged, stamped, additively manufactured, etc. The inner race 202 is annular, and is sized to be coupled about the diameter of the shaft 130 to support the shaft 130 for rotation relative to the outer race 206 and the static structure 210. The inner race 202 has a first inner surface 220 opposite a second inner surface 222. The first inner surface 220 is coupled to the shaft 130, and the second inner surface 222 is coupled to the bearing elements 204. In one example, the second inner surface 222 may include a concave inner recess 224, which is shaped to receive and partially retain the bearing elements 204. The second inner surface 222 defines an inner perimeter or diameter of the inner race 202, and surrounds a bore defined through the inner race 202.

The bearing elements 204 enable the rotation of the inner race 202 relative to the outer race 206. In one example, the bearing elements 204 comprise a plurality of ball bearings. In other examples, the bearing elements 204 may comprise a plurality of roller bearings, cylindrical roller bearings, needle bearings, etc. The bearing elements 204 are composed of a metal or metal alloy, and may be machined, additively manufactured, etc. The bearing elements 204 may be arranged between the inner race 202 and the outer race 206, and retained by the inner recess 224 and a concave outer recess 226 of the outer race 206. In other embodiments, the bearing elements 204 may be supported in a cage.

The outer race 206 is coupled to the bearing housing 208 via a press-fit, for example, but other techniques may be used, such as welding, mechanical fasteners, etc. The outer race 206 is coupled of a metal or metal alloy, and is cast, forged, stamped, additively manufactured, etc. The outer race 206 is annular, and is sized to be coupled about the bearing elements 204 and the inner race 202. The outer race 206 has a first outer surface 230 opposite a second outer surface 232. The first outer surface 230 is coupled to the bearing housing 208, and the second outer surface 232 is coupled to the bearing elements 204. In one example, the second outer surface 232 includes the outer recess 226, which is shaped to receive and partially retain the bearing elements 204. The bearing elements 204 rotate relative to the outer race 206. The second outer surface 232 defines an inner perimeter or diameter of the outer race 206, and surrounds a bore defined through the outer race 206.

The bearing housing 208 is coupled to the outer race 206, and to the flange 212 associated with the static structure 210.

The bearing housing 208 is composed of a metal or metal alloy, and is cast, forged, stamped, machined, additively manufactured, etc. The bearing housing 208 includes a first coupling section or race coupling section 240, a second coupling section or static coupling section 242 and a frangible section 244 between the race coupling section 240 and the static coupling section 242. In this example, the bearing housing 208 is substantially symmetric about the axis of rotation 140. The race coupling section 240 is at a first housing end 246, and the static coupling section 242 extends from the frangible section 244 to a second housing end 248. The second housing end 248 is opposite the first housing end 246.

Figure 3:
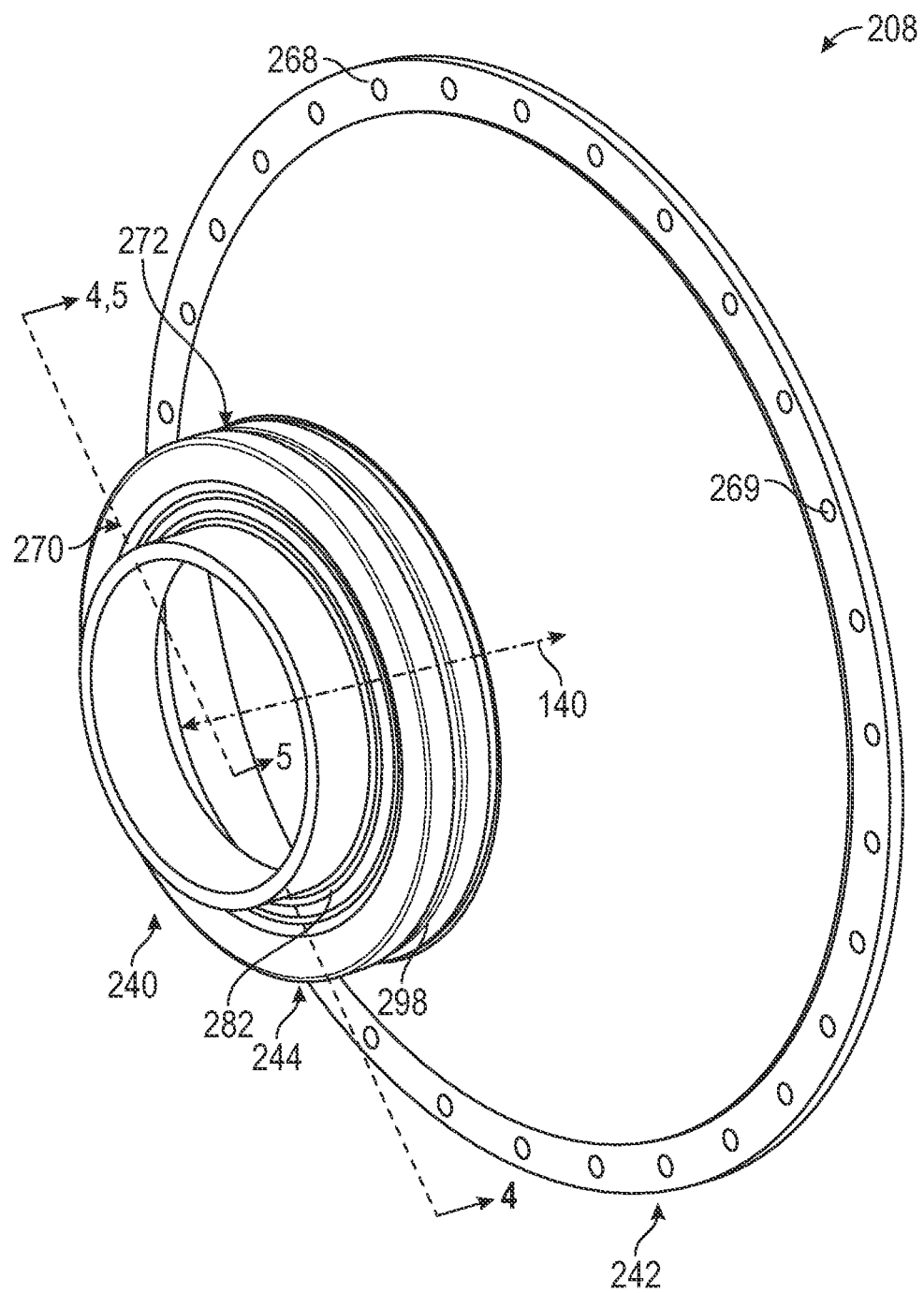
FIG. 3 is a perspective view of an exemplary bearing housing associated with the bearing assembly.
Figure 4:
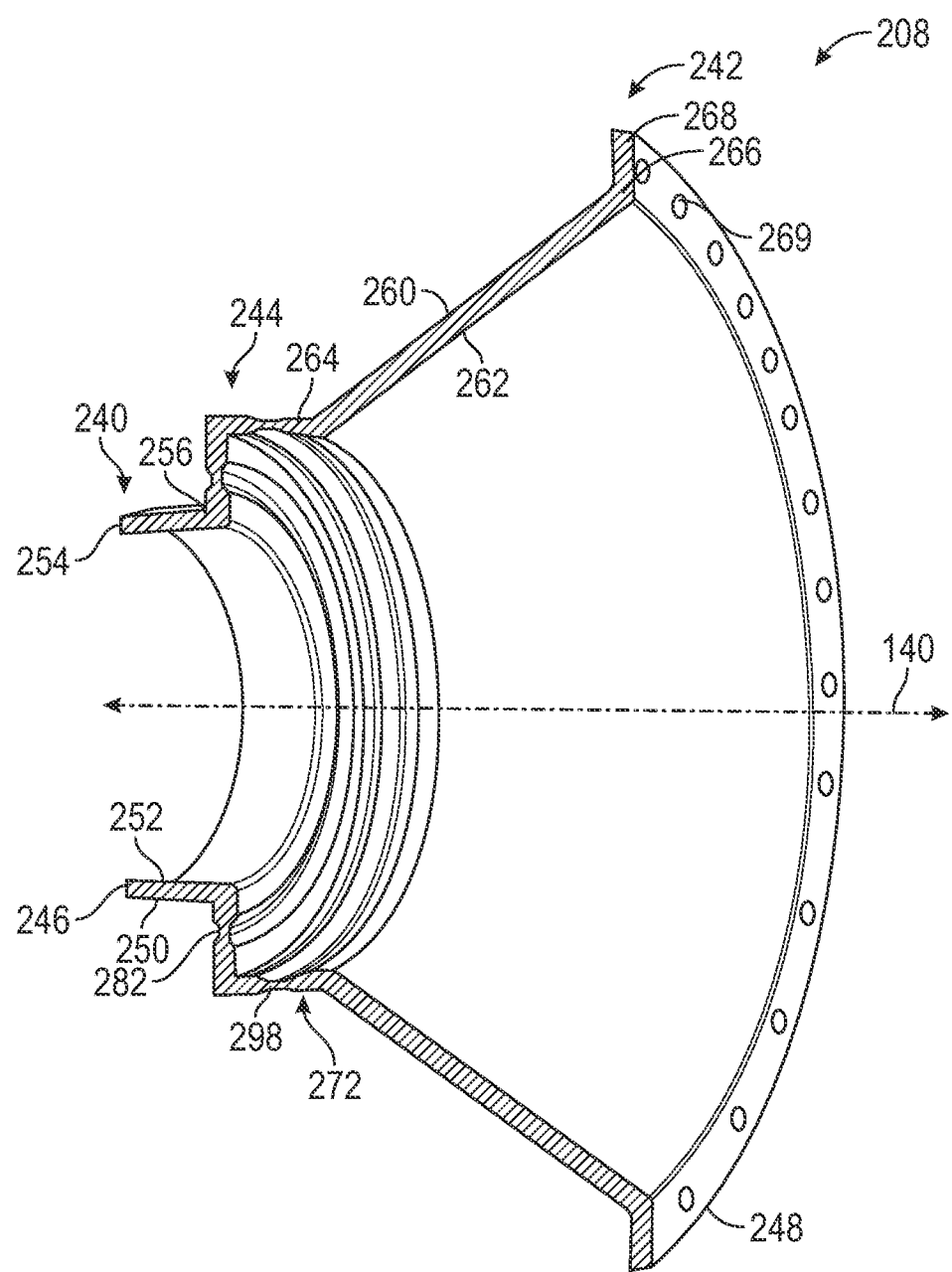
FIG. 4 is a cross-sectional view of the bearing housing of FIG. 3 taken along line 4-4 of FIG. 3.

With reference to FIG. 3, the bearing housing 208 is shown in greater detail. The race coupling section 240 is cylindrical, and is sized to be positioned about the outer race 206, the bearing elements 204 and the inner race 202. With reference to FIG. 4, the race coupling section 240 includes an outer race surface 250 opposite an inner race surface 252. The outer race surface 250 forms an outer surface or outer perimeter of the race coupling section 240, and the inner race surface 252 is coupled to the outer race 206 via press-fit, welding, mechanical fasteners. etc. The inner race surface 252 defines an inner perimeter or diameter of the race coupling section 240, and surrounds a bore defined through the race coupling section 240. The race coupling section 240 also has a first race end 254 opposite a second race end 256. The first race end 254 is defined at the first housing end 246 and the second race end 256 is coupled to the frangible section 244. With additional reference to FIG. 5, the race coupling section 240 generally extends for a first distance D1 from the first housing end 246 to the frangible section 244 along the axis of rotation 140. In one example, the first distance D1 is about 0.8 inches (in.) to about 1.2 inches (in.). The race coupling section 240 has a first thickness T1 defined between the outer race surface 250 and the inner race surface 252. The first thickness T1 is uniform over the race coupling section 240. In one example, the first thickness T1 is about 0.1 inches (in.) to about 0.5 inches (in.).

With reference back to FIG. 3, the static coupling section 242 is frustoconical, and is sized to extend from the frangible section 244 to couple to the flange 212 associated with the static structure 210 (FIG. 2). In this example, the static coupling section 242 tapers from the second housing end 248 to the frangible section 244. With reference to FIG. 4, the static coupling section 242 includes an outer static surface 260 opposite an inner static surface 262. The outer static surface 260 forms an outer surface or outer perimeter of the static coupling section 242, and the inner static surface 262 faces the shaft 130. The inner static surface 262 defines an inner perimeter or diameter of the static coupling section 242, and surrounds a bore defined through the static coupling section 242. The static coupling section 242 also has a first static end 264 opposite a second static end 266. The first static end 264 is coupled to the frangible section 244, and the second static end 266 is defined at the second housing end 248. The second static end 266 includes a flange 268, which extends radially about the perimeter or circumference of the static coupling section 242 at the second static end 266. The flange 268 may include one or more bores 269, which receive the one or more bolts 216 (FIG. 1) to couple the bearing housing 208 to the static structure 210. With additional reference to FIG. 5, the static coupling section 242 generally extends for a second distance D2 from the frangible section 244 to the second housing end 248 along the axis of rotation 140. In one example, the second distance D2 is about 3.0 inches (in.) to about 3.5 inches (in.). The second distance D2 is different and greater than the distance D1. The static coupling section 242 has a second thickness T2 defined between the outer static surface 260 and the inner static surface 262. The second thickness T2 is uniform over the static coupling section 242. The second thickness T2 is about the same as the thickness T1.

Figure 5:
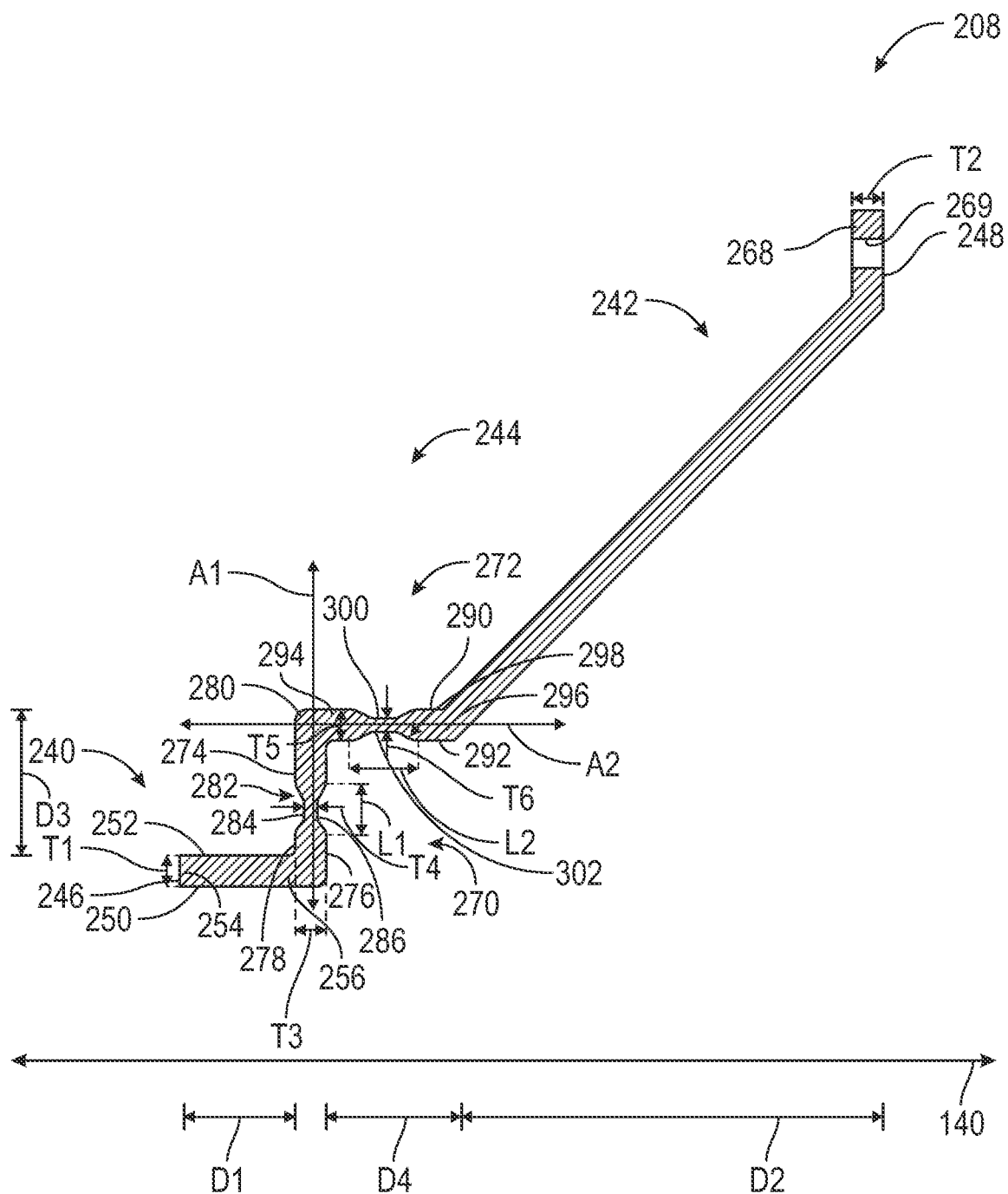
FIG. 5 is a cross-sectional view of the bearing housing of FIG. 3 taken along line 5-5 of FIG. 3.

With reference back to FIGS. 3 and 4, the frangible section 244 is defined between the race coupling section 240 and the static coupling section 242. The frangible section 244 is substantially L-shaped, and includes a first frangible portion 270 and a second frangible portion 272. With reference to FIG. 5, the first frangible portion 270 extends along an axis A1, which is substantially perpendicular to the axis of rotation 140. Thus, generally, the first frangible portion 270 extends radially from and relative to the race coupling section 240. The first frangible portion 270 includes a first outer surface 274 opposite a first inner surface 276. The first outer surface 274 defines an outer surface or outer perimeter of the first frangible portion 270, and the first inner surface 276 defines an inner surface or perimeter of the first frangible portion 270. The first frangible portion 270 also has a first portion end 278 opposite a second portion end 280. The first portion end 278 is coupled to the second race end 256 and the second portion end 280 is coupled to the second frangible portion 272. The first frangible portion 270 generally extends for a third distance D3 from the second race end 256 to the second frangible portion 272 in a radial direction relative to the axis of rotation 140. In one example, the third distance D3 is about 0.8 inches (in.) to about 1.2 inches (in.). The first frangible portion 270 has a third thickness T3 at the first portion end 278 and the second portion end 280, and has a fourth thickness T4 defined between the first portion end 278 and the second portion end 280. The third thickness T3 is about the same as the first thickness T1 and the second thickness T2. The fourth thickness T4 is different and less than the third thickness T3, and thus, the first thickness T1 and the second thickness T2. In one example, the fourth thickness T4 is about 0.03 inches (in.) to about 0.08 inches (in.). The fourth thickness T4 defines a first area of reduced thickness 282. In this example, the first area of reduced thickness 282 extends for a first length L1 about the perimeter of the bearing housing 208. In one example, the first length L1 is about 0.2 inches (in.) to about 0.5 inches (in.).

In this example, the first area of reduced thickness 282 is defined by a first concave groove 284 recessed into the first outer surface 274 and an opposite second concave groove 286 recessed into the first inner surface 276. The opposed grooves 284, 286 reduce the thickness of the first frangible portion 270 to the fourth thickness T4 between the first portion end 278 and the second portion end 280. By reducing the thickness of the first frangible portion 270 to the fourth thickness T4, the first frangible portion 270 is configured to release, break, or fracture along the first area of reduced thickness 282 to inhibit the transfer of a moment load that is greater than a predetermined moment threshold. In one example, the moment threshold is about 70,000 pound-force inch (lbf-in.) to about 90,000 pound-force inch (lbf-in.). By releasing, breaking or fracturing along the first area of reduced thickness 282 upon receipt of a moment load greater than the moment threshold, the first frangible portion 270 isolates the moment load from the static structure 210 (FIG. 2). This inhibits the static structure 210 from absorbing the moment load.

The second frangible portion 272 extends along an axis A2, which is substantially parallel to the axis of rotation 140. Thus, generally, the second frangible portion 272 extends axially relative to the race coupling section 240. The second frangible portion 272 includes a second outer surface 290 opposite a second inner surface 292. The second outer surface 290 defines an outer surface or outer perimeter of the second frangible portion 272, and the second inner surface 292 defines an inner surface or perimeter of the second frangible portion 272. The second frangible portion 272 also has a third portion end 294 opposite a fourth portion end 296. The third portion end 294 is coupled to the first frangible portion 270 and the fourth portion end 296 is coupled to the static coupling section 242. The second frangible portion 272 generally extends for a fourth distance D4 from the first frangible portion 270 to the static coupling section 242 along the axis of rotation 140. In one example, the fourth distance D4 is about 0.8 inches (in.) to about 1.2 inches (in.). The second frangible portion 272 has a fifth thickness T5 at the third portion end 294 and the fourth portion end 296, and has a sixth thickness T6 defined between the third portion end 294 and the fourth portion end 296. The fifth thickness T5 is about the same as the first thickness T1, the second thickness T2 and the third thickness T3. The sixth thickness T6 is different and less than the first thickness T1, the second thickness T2 and the third thickness T3. In one example, the sixth thickness T6 is the about the same as the fourth thickness T4. The sixth thickness T6 defines a second area of reduced thickness 298. In this example, the second area of reduced thickness 298 extends for a second length L2 about the perimeter of the bearing housing 208. In one example, the second length L2 is about the same as the first length L1. The first area of reduced thickness 282 is spaced a distance apart from the second area of reduced thickness 298.

In this example, the second area of reduced thickness 298 is defined by a third concave groove 300 recessed into the second outer surface 290 and an opposite fourth concave groove 302 recessed into the second inner surface 292. The opposed grooves 300, 302 reduce the thickness of the second frangible portion 272 to the sixth thickness T6 between the third portion end 294 and the fourth portion end 296. By reducing the thickness of the second frangible portion 272 to the sixth thickness T6, the second frangible portion 272 is configured to release, break or fracture along the second area of reduced thickness 298 to inhibit the transfer of a shear or radial load that is greater than a predetermined shear or radial threshold. In one example, the radial threshold is about 45,000 pound-force (lbf) to about 60,000 pound-force (lbf). By releasing, breaking or fracturing along the second area of reduced thickness 298 upon receipt of a radial load greater than the radial threshold, the second frangible portion 272 isolates the radial load from the static structure 210 (FIG. 2). This inhibits the static structure 210 from absorbing the radial load.

In this example, the grooves 284, 286, 300, 302 are defined to extend about the circumference of the bearing housing 208 on the respective one of the surfaces 274, 276, 290, 292, however, in other examples, one of the grooves 284, 286, 300, 302 may be defined to a greater depth on one of the surfaces 274, 276, 290, 292 such that the first frangible portion 270 and the second frangible portion 272 have the respective one of the fourth thickness T4 and the sixth thickness T6 with a single groove. In addition, while the areas of reduced thickness 282, 298 are described as areas, the grooves 284, 286, 300, 302 may be defined to result in a line of reduced thickness, if desired.

Figure 6:
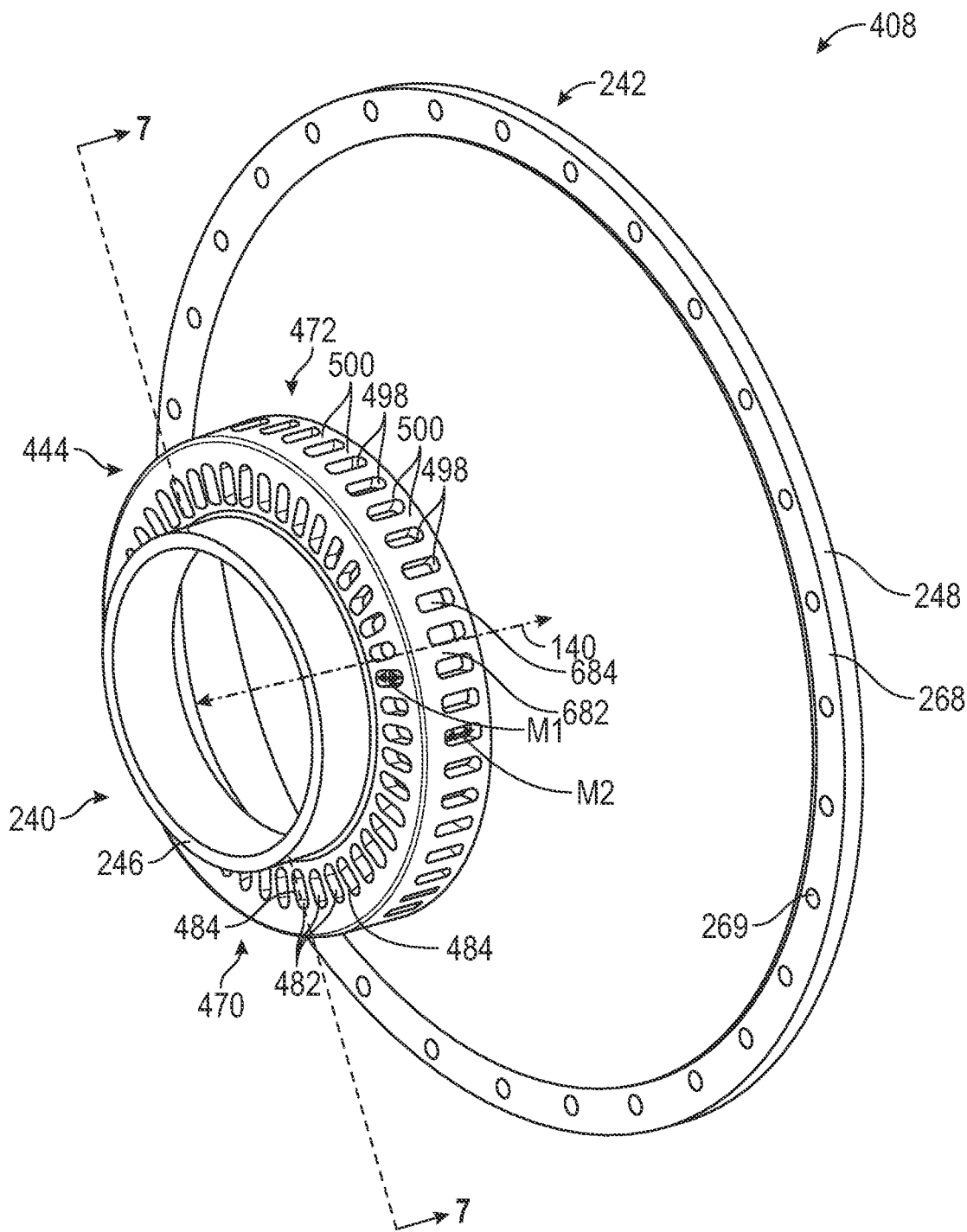
FIG. 6 is another exemplary bearing housing for use with the bearing assembly of FIG. 1.

In addition, it should be noted that while the first frangible portion 270 and the second frangible portion 272 of the bearing housing 208 are shown in FIGS. 1-5 as comprising continuous grooves 284, 286, 300, 302 defined about the perimeter or circumference, in other embodiments, the first frangible portion 270 and the second frangible portion 272 may be configured differently to release, fracture or break upon receipt of a respective one of a predetermined moment load and radial load. For example, with reference to FIG. 6, a bearing housing 408 is shown for use with the gas turbine engine 100 (FIG. 1). As the bearing housing 408 includes components that are the same or similar to components of the bearing housing 208 discussed with regard to FIGS. 1-5, the same reference numerals will be used to denote the same or similar components. The bearing housing 408 is coupled to the outer race 206, and to the flange 212 associated with the static structure 210 (FIG. 2). The bearing housing 408 is composed of a metal or metal alloy, and is cast, forged, stamped, machined, additively manufactured, etc. In this example, the bearing housing 408 includes the first coupling section or race coupling section 240, the second coupling section or static coupling section 242 and a frangible section 444 between the race coupling section 240 and the static coupling section 242. In this example, the bearing housing 408 is substantially symmetric about the axis of rotation 140. The race coupling section 240 is at the first housing end 246, and the static coupling section 242 extends from the frangible section 444 to the second housing end 248. The second housing end 248 is opposite the first housing end 246.

Figure 7:
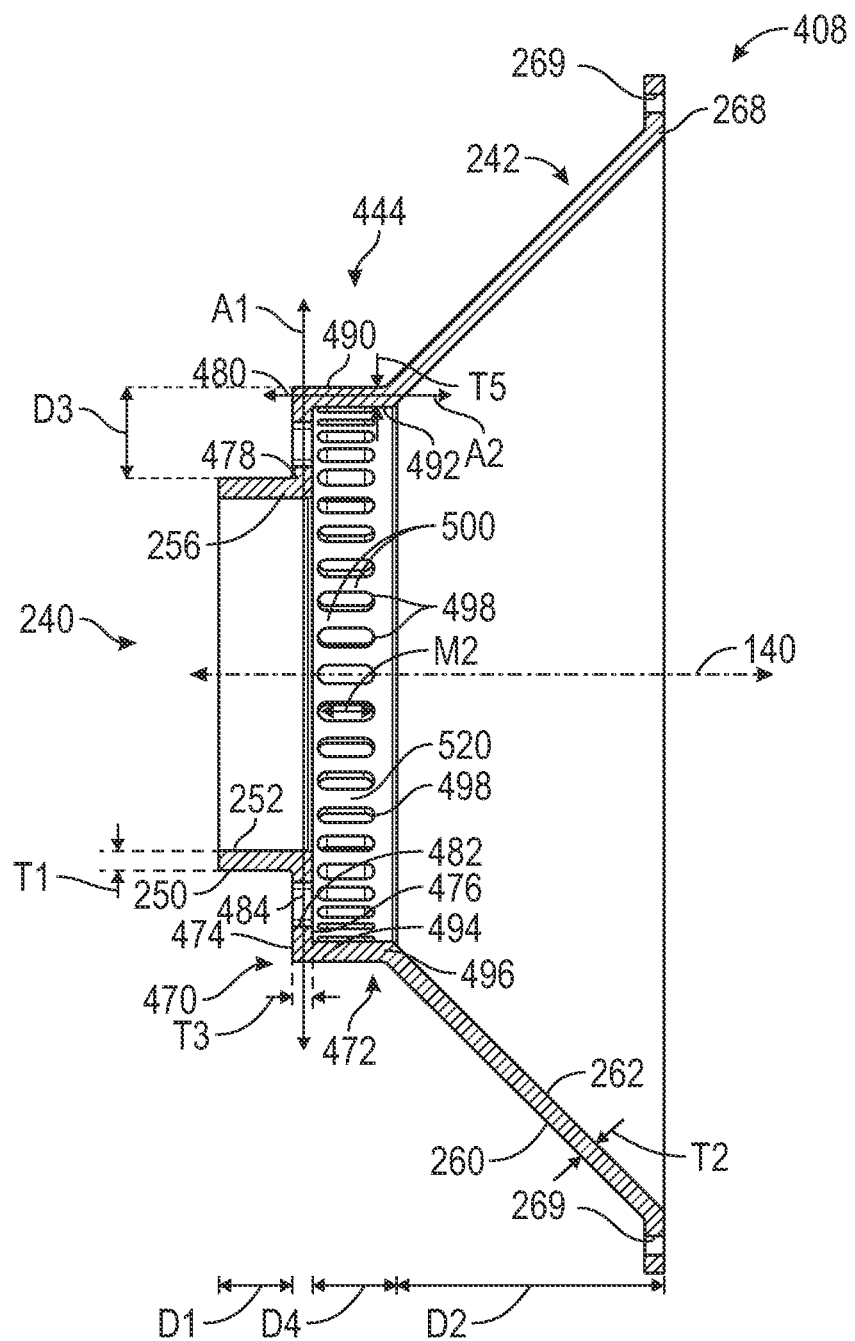
FIG. 7 is a cross-sectional view of the bearing housing of FIG. 6 taken along line 7-7 of FIG. 6.

The race coupling section 240 is cylindrical, and is sized to be positioned about the outer race 206, the bearing elements 204 and the inner race 202 (FIG. 2). With reference to FIG. 7, the race coupling section 240 has the first thickness T1 defined between the outer race surface 250 and the inner race surface 252. The static coupling section 242 is frustoconical, and is sized to extend from the frangible section 444 to couple to the flange 212 associated with the static structure 210 (FIG. 2). The static coupling section 242 has the second thickness T2 defined between the outer static surface 260 and the inner static surface 262.

The frangible section 444 is defined between the race coupling section 240 and the static coupling section 242. The frangible section 444 is substantially L-shaped, and includes a first frangible portion 470 and a second frangible portion 472. The first frangible portion 470 extends along the axis A1, which is substantially perpendicular to the axis of rotation 140. Thus, generally, the first frangible portion 470 extends radially from and relative to the race coupling section 240. The first frangible portion 470 includes a first outer surface 474 opposite a first inner surface 476. The first outer surface 474 defines an outer surface or outer perimeter of the first frangible portion 470, and the first inner surface 476 defines an inner surface or perimeter of the first frangible portion 470. The first frangible portion 470 also has a first portion end 478 opposite a second portion end 480. The first portion end 478 is coupled to the second race end 256 and the second portion end 480 is coupled to the second frangible portion 472. The first frangible portion 470 generally extends for the third distance D3 from the second race end 256 to the second frangible portion 472 in a radial direction relative to the axis of rotation 140. The first frangible portion 470 has the third thickness T3 at the first portion end 478 and the second portion end 480.

In this example, with reference back to FIG. 6, the first frangible portion 470 includes a plurality of first slots 482 defined between the first portion end 478 and the second portion end 480 about the perimeter of the first frangible portion 470. Each of first slots 482 are substantially oval in shape, and are spaced apart about the perimeter of the first frangible portion 470. Each of the first slots 482 have a major axis M1, which is substantially perpendicular to the axis of rotation 140. The first slots 482 are defined through the first outer surface 474 and the first inner surface 476 such that the first slots 482 result in a void or an area of the first frangible portion 470 that is removed. The formation of the first slots 482 about the perimeter of the first frangible portion 470 also results in a plurality of first ligaments 484 being defined about the perimeter of the first frangible portion 470. A respective first ligament 484 is defined between each of the first slots 482. Each of the first ligaments 484 is configured to release, break or fracture to inhibit the transfer of the moment load that is greater than the predetermined moment threshold. By releasing, breaking or fracturing along the first ligaments 484 upon receipt of the moment load greater than the moment threshold, the first frangible portion 470 isolates the moment load from the static structure 210 (FIG. 2). This inhibits the static structure 210 from absorbing the moment load.

With reference to FIG. 7, the second frangible portion 472 extends along the axis A2, which is substantially parallel to the axis of rotation 140. Thus, generally, the second frangible portion 472 extends axially relative to the race coupling section 240. The second frangible portion 472 includes a second outer surface 490 opposite a second inner surface 492. The second outer surface 490 defines an outer surface or outer perimeter of the second frangible portion 472, and the second inner surface 492 defines an inner surface or perimeter of the second frangible portion 472. The second frangible portion 472 also has a third portion end 494 opposite a fourth portion end 496. The third portion end 494 is coupled to the first frangible portion 470 and the fourth portion end 496 is coupled to the static coupling section 242. The second frangible portion 472 generally extends for the fourth distance D4 from the first frangible portion 470 to the static coupling section 242 relative to the axis of rotation 140. The second frangible portion 472 has the fifth thickness T5 at the third portion end 494 and the fourth portion end 496.

In this example, the second frangible portion 472 includes a plurality of second slots 498 defined between the third portion end 494 and the fourth portion end 496 about the perimeter of the second frangible portion 472. Each of second slots 498 are substantially oval in shape, and are spaced apart about the perimeter of the second frangible portion 472. Each of the second slots 498 have a second major axis M2, which is substantially parallel to the axis of rotation 140. The second slots 498 are spaced a distance apart from the first slots 482. The second slots 498 are defined through the second outer surface 490 and the second inner surface 492 such that the second slots 498 result in a void or an area of the second frangible portion 472 that is removed. The formation of the second slots 498 about the perimeter of the second frangible portion 472 also results in a plurality of second ligaments 500 being defined about the perimeter of the second frangible portion 472. A respective second ligament 500 is defined between each of the second slots 498. Each of the second ligaments 500 is configured to release, break or fracture to inhibit the transfer of the shear or radial load that is greater than the predetermined radial threshold. By releasing, breaking or fracturing along the second ligaments 500 upon receipt of the radial load greater than the radial threshold, the second frangible portion 472 isolates the radial load from the static structure 210 (FIG. 2). This inhibits the static structure 210 from absorbing the radial load.

Figure 8:
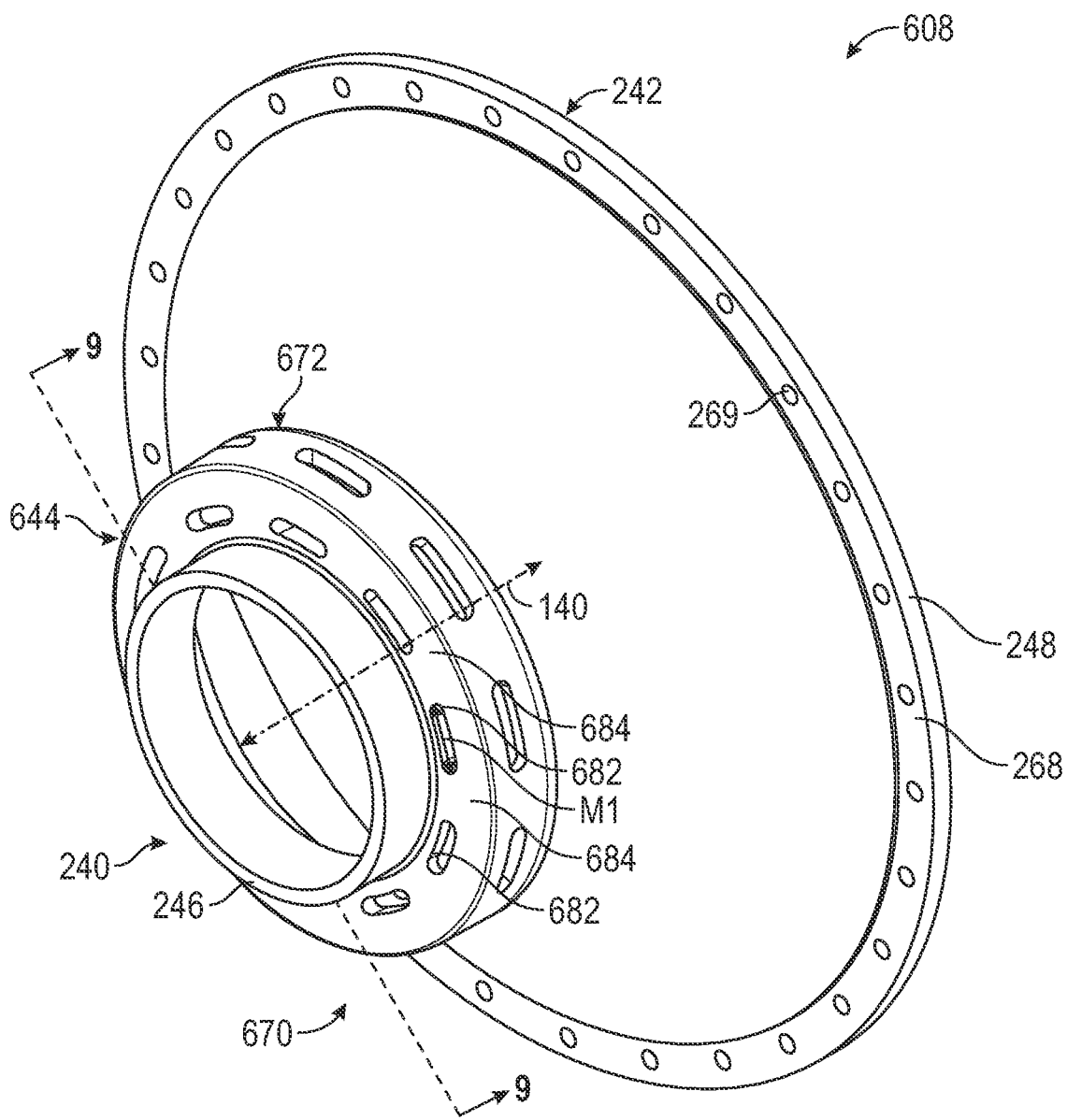
FIG. 8 is yet another exemplary bearing housing for use with the bearing assembly of FIG. 1.

In addition, it should be noted that while the first frangible portion 270 and the second frangible portion 272 of the bearing housing 208 are shown in FIGS. 1-5 as comprising continuous grooves 284, 286, 300, 302 defined about the perimeter or circumference, in other embodiments, the first frangible portion 270 and the second frangible portion 272 may be configured differently to release, fracture or break upon receipt of a respective one of a predetermined moment load and radial load. For example, with reference to FIG. 8, a bearing housing 608 is shown for use with the gas turbine engine 100 (FIG. 1). As the bearing housing 608 includes components that are the same or similar to components of the bearing housing 208 discussed with regard to FIGS. 1-5, the same reference numerals will be used to denote the same or similar components. The bearing housing 608 is coupled to the outer race 206, and to the flange 212 associated with the static structure 210 (FIG. 2). The bearing housing 608 is composed of a metal or metal alloy, and is cast, forged, stamped, machined, additively manufactured, etc. In this example, the bearing housing 608 includes the first coupling section or race coupling section 240, the second coupling section or static coupling section 242 and a frangible section 644 between the race coupling section 240 and the static coupling section 242. In this example, the bearing housing 608 is substantially symmetric about the axis of rotation 140. The race coupling section 240 is at the first housing end 246, and the static coupling section 242 extends from the frangible section 644 to the second housing end 248. The second housing end 248 is opposite the first housing end 246.

Figure 9:
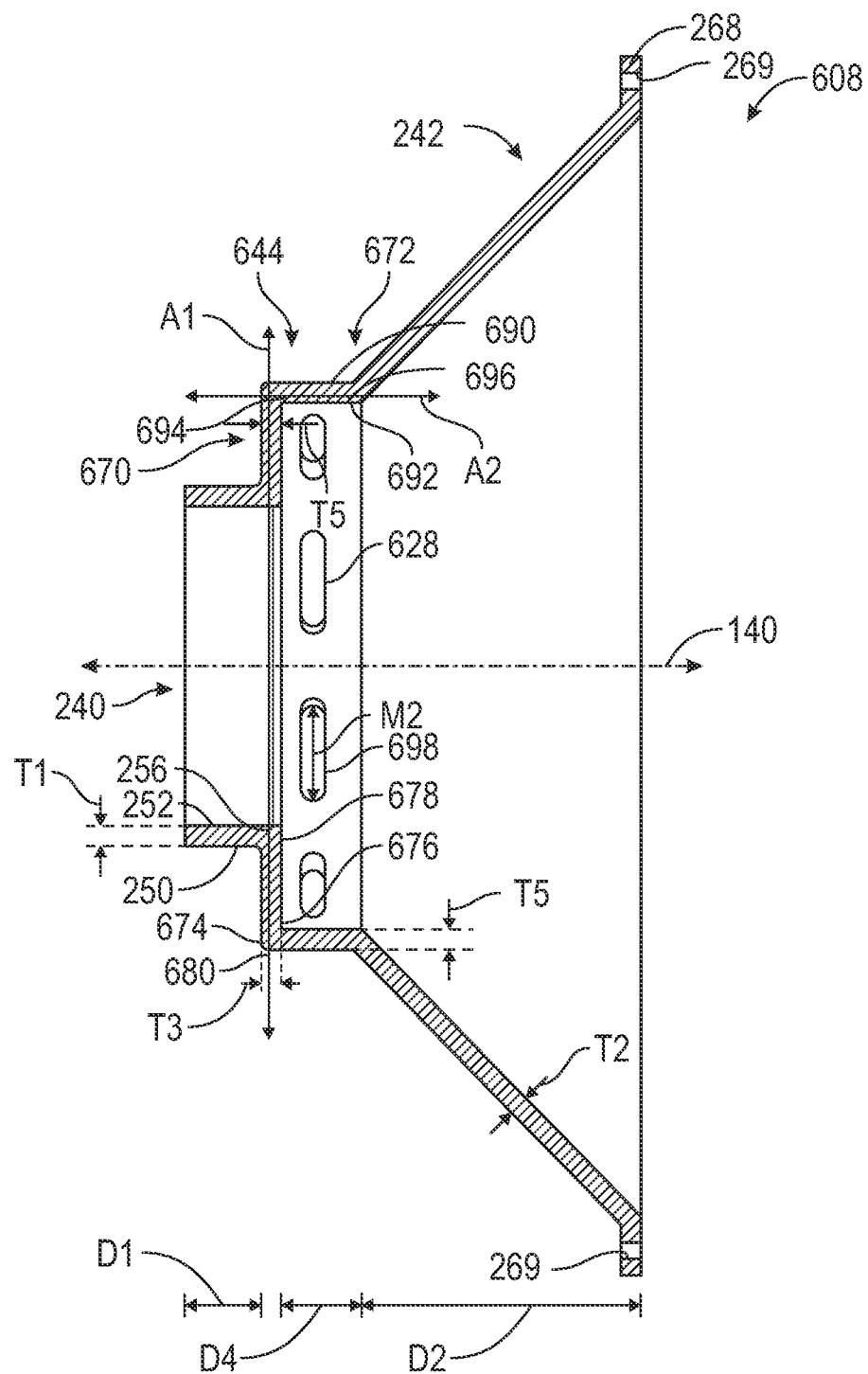
FIG. 9 is a cross-sectional view of the bearing housing of FIG. 8 taken along line 9-9 of FIG. 8.

The race coupling section 240 is cylindrical, and is sized to be positioned about the outer race 206, the bearing elements 204 and the inner race 202 (FIG. 2). With reference to FIG. 9, the race coupling section 240 has the first thickness T1 defined between the outer race surface 250 and the inner race surface 252. The static coupling section 242 is frustoconical, and is sized to extend from the frangible section 444 to couple to the flange 212 associated with the static structure 210 (FIG. 2). The static coupling section 242 has the second thickness T2 defined between the outer static surface 260 and the inner static surface 262.

The frangible section 644 is defined between the race coupling section 240 and the static coupling section 242. The frangible section 644 is substantially L-shaped, and includes a first frangible portion 670 and a second frangible portion 672. The first frangible portion 670 extends along the axis A1, which is substantially perpendicular to the axis of rotation 140. Thus, generally, the first frangible portion 670 extends radially from and relative to the race coupling section 240. The first frangible portion 670 includes a first outer surface 674 opposite a first inner surface 676. The first outer surface 674 defines an outer surface or outer perimeter of the first frangible portion 670, and the first inner surface 676 defines an inner surface or perimeter of the first frangible portion 670. The first frangible portion 670 also has a first portion end 678 opposite a second portion end 680. The first portion end 678 is coupled to the second race end 256 and the second portion end 680 is coupled to the second frangible portion 672. The first frangible portion 670 generally extends for the third distance D3 from the second race end 256 to the second frangible portion 672 in a radial direction relative to the axis of rotation 140. The first frangible portion 670 has the third thickness T3 at the first portion end 678 and the second portion end 680.

In this example, with reference back to FIG. 8, the first frangible portion 670 includes a plurality of first slots 682 defined between the first portion end 678 and the second portion end 680 about the perimeter of the first frangible portion 670. Each of first slots 682 are substantially oval in shape, and are spaced apart about the perimeter of the first frangible portion 470. Each of the first slots 682 have a major axis M1, which is substantially perpendicular to the axis of rotation 140. The first slots 682 are defined through the first outer surface 674 and the first inner surface 676 such that the first slots 682 result in a void or an area of the first frangible portion 670 that is removed. The formation of the first slots 682 about the perimeter of the first frangible portion 670 also results in a plurality of first ligaments 684 being defined about the perimeter of the first frangible portion 670. A respective first ligament 684 is defined between each of the first slots 682. Each of the first ligaments 684 is configured to release, break or fracture to inhibit the transfer of the moment load that is greater than the predetermined moment threshold. By releasing, breaking, or fracturing along the first ligaments 684 of the first frangible portion 670 upon receipt of the moment load greater than the moment threshold, the first frangible portion 670 isolates the moment load from the static structure 210 (FIG. 2). This inhibits the static structure 210 from absorbing the moment load.

With reference to FIG. 9, the second frangible portion 672 extends along the axis A2, which is substantially parallel to the axis of rotation 140. Thus, generally, the second frangible portion 672 extends axially relative to the race coupling section 240. The second frangible portion 672 includes a second outer surface 690 opposite a second inner surface 692. The second outer surface 690 defines an outer surface or outer perimeter of the second frangible portion 672, and the second inner surface 692 defines an inner surface or perimeter of the second frangible portion 672. The second frangible portion 672 also has a third portion end 694 opposite a fourth portion end 696. The third portion end 694 is coupled to the first frangible portion 670 and the fourth portion end 696 is coupled to the static coupling section 242. The second frangible portion 672 generally extends for the fourth distance D4 from the first frangible portion 670 to the static coupling section 242 relative to the axis of rotation 140. The second frangible portion 672 has the fifth thickness T5 at the third portion end 694 and the fourth portion end 696.

In this example, the second frangible portion 672 includes a plurality of second slots 698 defined between the third portion end 694 and the fourth portion end 696 about the perimeter of the second frangible portion 672. Each of second slots 698 are substantially oval in shape, and are spaced apart about the perimeter of the second frangible portion 672. Each of the second slots 698 have a second major axis M2, which is substantially perpendicular to the axis of rotation 140. The second slots 698 are spaced a distance apart from the first slots 682. The second slots 698 are defined through the second outer surface 690 and the second inner surface 692 such that the second slots 698 result in a void or an area of the second frangible portion 672 that is removed. The formation of the second slots 698 about the perimeter of the second frangible portion 672 also results in a plurality of second ligaments 700 being defined about the perimeter of the second frangible portion 672. A respective second ligament 700 is defined between each of the second slots 598. Each of the second ligaments 700 is configured to release, break or fracture to inhibit the transfer of the shear or radial load that is greater than the predetermined radial threshold. By releasing, breaking or fracturing along the second ligaments 700 upon receipt of the radial load greater than the radial threshold, the second frangible portion 672 isolates the radial load from the static structure 210 (FIG. 2). This inhibits the static structure 210 from absorbing the radial load.

It should be noted that while the bearing housing 208, 408, 608 is illustrated herein as including the grooves 284, 286, 300, 302, the slots 482, 498 and the slots 682, 698, respectively, a bearing housing may include any combination of the grooves 284, 286, 300, 302, the slots 482, 498 and the slots 682, 698 to enable the bearing housing to isolate moment and radial loads from the static structure 210 (FIG. 2).

In one example, with reference to FIGS. 2-9, the inner race 202, the bearing elements 204 and the outer race 206 are coupled to the shaft 130. With the bearing housing 208, 408, 608 formed, the bearing housing 208, 408, 608 is coupled to the outer race 206 such that the outer race 206 is received within and coupled to the race coupling section 240. With the outer race 206 coupled to the bearing housing 208, 408, 608, the flange 268 is coupled to the static structure 210 via the bolts 216. With the bearing housing 208, 408, 608 installed in the gas turbine engine 100 (FIG. 1), as the gas turbine engine 100 operates, the shaft 130 rotates.

In the instance of a moment load being imparted to the bearing assembly 200 that is greater than the moment threshold, the first frangible portion 270, 470, 670 releases, breaks or fractures to absorb the load and isolate the static structure 210 from the moment load. In the example of the first frangible portion 270, the first frangible portion 270 releases, breaks or factures along the grooves 284, 286 upon receipt of the moment load that is greater than the moment threshold. In the example of the first frangible portion 470, 670, the first frangible portion 470, 670 releases, breaks or factures along the first ligaments 484, 684 upon receipt of the moment load that is greater than the moment threshold.

In the instance of a shear or radial load being imparted to the bearing assembly 200 that is greater than the radial threshold, the second frangible portion 272, 472, 672 releases, breaks or fractures to absorb the load and isolate the static structure 210 from the radial load. In the example of the second frangible portion 272, the second frangible portion 272 releases, breaks or factures along the grooves 300, 302 upon receipt of the radial load that is greater than the radial threshold. In the example of the second frangible portion 472, 672, the second frangible portion 472, 672 releases, breaks or factures along the second ligaments 500, 700 upon receipt of the radial load that is greater than the radial threshold.

Thus, the bearing assembly 200 including the bearing housing 208, 408, 608 provides load isolation for the gas turbine engine 100 (FIG. 1), which inhibits the transfer of moment and radial loads to the static structure 210 through the bearing assembly 200. Each of the first frangible portion 270, 470, 670 and the second frangible portion 272, 472, 672 may release, break or fracture independently upon receipt of the respective moment load or radial load that exceeds the respective moment threshold or radial threshold. This inhibits the static structure 210 (FIG. 2) from absorbing the respective moment load or radial load, which inhibits damage to the static structure 210 from moment or radial loads.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A bearing assembly, comprising:
   an inner race configured to receive a rotating component having an axis of rotation;
   at least one bearing element coupled to the inner race, the at least one bearing element configured to rotate with the inner race along the axis of rotation;
   an outer race coupled to the at least one bearing element; and
   a bearing housing coupled to the outer race and configured to be coupled to a static structure, the bearing housing including a first frangible portion configured to release upon receipt of a moment load greater than a moment threshold and a second frangible portion configured to release upon receipt of a radial load greater than a radial threshold.

2. The bearing assembly of claim 1, wherein the first frangible portion is defined on the bearing housing along an axis substantially perpendicular to the axis of rotation.

3. The bearing assembly of claim 1, wherein the second frangible portion is defined on the bearing housing along an axis substantially parallel to the axis of rotation.

4. The bearing assembly of claim 1, wherein the first frangible portion includes at least one first groove that defines a reduced thickness.

5. The bearing assembly of claim 4, wherein the second frangible portion includes at least one second groove that defines a second reduced thickness.

6. The bearing assembly of claim 4, wherein the at least one first groove is continuous about a perimeter of the first frangible portion.

7. The bearing assembly of claim 4, wherein the at least one first groove comprises a pair of opposed grooves that cooperate to define the reduced thickness.

8. The bearing assembly of claim 1, wherein the first frangible portion includes a plurality of first slots spaced apart about a perimeter of the first frangible portion.

9. The bearing assembly of claim 8, wherein the second frangible portion includes a plurality of second slots spaced apart about a second perimeter of the second frangible portion.

10. The bearing assembly of claim 9, wherein each second slot extends along a major axis, and the major axis is substantially parallel to the axis of rotation.

11. The bearing assembly of claim 8, wherein each first slot extends along a major axis, and the major axis is substantially perpendicular to the axis of rotation.

12. The bearing assembly of claim 1, wherein the bearing housing includes a first coupling section to be coupled to the outer race, a second coupling section configured to be coupled to the static structure, and the first frangible portion and the second frangible portion are defined between the first coupling section and the second coupling section.

13. The bearing assembly of claim 12, wherein the first frangible portion extends radially outward from the first coupling section, and the second frangible portion extends axially from the first frangible portion relative to the axis of rotation.

14. The bearing assembly of claim 13, wherein the second frangible portion is coupled to a first end of the second coupling section, and the second coupling section defines a flange at a second end, with the second end opposite the first end.

15. The bearing assembly of claim 1, wherein the rotating component is a shaft associated with a gas turbine engine.

16. A bearing assembly for a gas turbine engine, comprising:
- an inner race configured to receive a rotating component having an axis of rotation;
- at least one bearing element coupled to the inner race, the at least one bearing element configured to rotate with the inner race along the axis of rotation;
- an outer race coupled to the at least one bearing element; and
- a bearing housing coupled to the outer race and configured to be coupled to a static structure, the bearing housing including a first frangible portion and a second frangible portion, the first frangible portion extending along a first axis substantially perpendicular to the axis of rotation, the first frangible portion configured to release upon receipt of a moment load greater than a moment threshold, the second frangible portion extending along a second axis substantially parallel to the axis of rotation and the second frangible portion is configured to release upon receipt of a radial load greater than a radial threshold.

17. The bearing assembly of claim 16, wherein the first frangible portion includes a pair of opposed grooves that cooperate to define a reduced thickness and each groove of the pair of opposed grooves is continuous about a perimeter of the first frangible portion.

18. The bearing assembly of claim 16, wherein the first frangible portion includes a plurality of first slots spaced apart about a perimeter of the first frangible portion and the second frangible portion includes a plurality of second slots spaced apart about a second perimeter of the second frangible portion.

19. The bearing assembly of claim 18, wherein each second slot extends along a major axis, the major axis is substantially parallel to the axis of rotation.

20. The bearing assembly of claim 18, wherein each first slot extends along a major axis, and the major axis is substantially perpendicular to the axis of rotation.

* * * * *